Nov. 30, 1926.
J. L. MacINERNEY
1,608,705
CLIP
Filed April 5, 1926
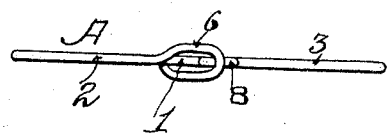
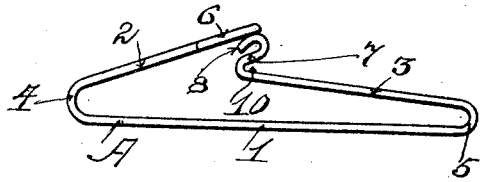
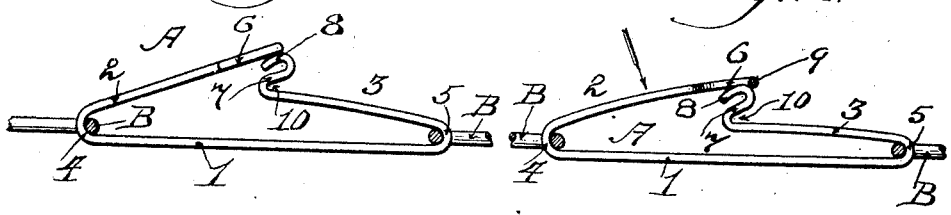
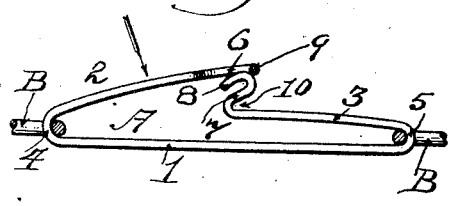
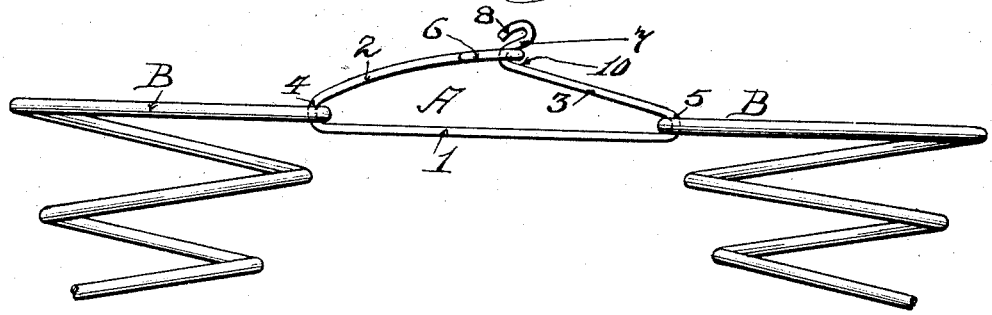
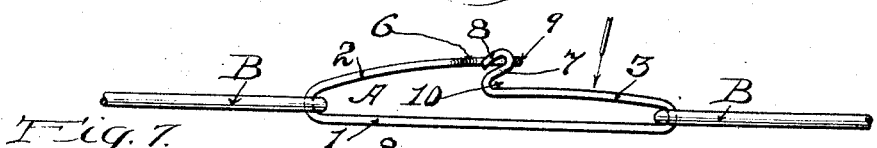
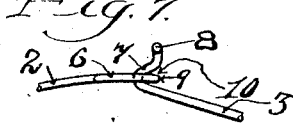
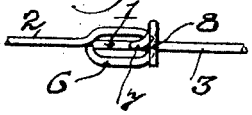
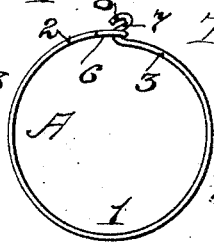
Inventor:
James L. MacInerney,
by Brown & MacGregor
Attys Patented Nov. 30, 1926.

1,608,705

UNITED STATES PATENT OFFICE.

JAMES L. MacINERNEY, OF GRAND RAPIDS, MICHIGAN.

CLIP.

Application filed April 5, 1926. Serial No. 99,711.

This invention relates to fastening devices and more particularly to those devices made of wire, commonly called clips, for holding together two separated parts, such, for example, as body springs in upholstery structures.

The object of the invention is to produce a clip made of a continuous piece of wire, so shaped that it will be very easy of manipulation in attaching it to the parts to be held together, and in which it will be convenient to engage the ends of the clip so as to secure them together.

Another object of the invention is to produce a spring wire clip having its meeting ends so shaped that upon pressure being applied to one of them, engagement or disengagement of the two ends will take place automatically.

Another object of the invention is to produce an arrangement for the engaging ends which, by a slight twist of one of the parts, will cause them to be locked in position.

Another object of the invention is to produce a clip which may be very easily and cheaply made, which will be simple and durable, and efficient for its intended purpose.

With these objects in view, the invention consists in the device and combination of devices herein illustrated, described and claimed.

In the drawings:

Figure 1 is a top or plan view of a clip embodying my invention, showing the meeting ends centrally disposed.

Figure 2 is a side elevation of the same, in modified form.

Figure 3 is a side elevation of the form shown in Figure 1, in position for use, and with its meeting ends about to be engaged.

Figure 4 is a similar view, partly in section, showing where pressure is applied on one of the ends to engage the two ends together.

Figure 5 is a side elevation of the same, showing the device clipped to hold a pair of body springs together, the meeting ends of the clip being engaged.

Figure 6 is a side elevation of the device, showing where pressure is applied to disengage the meeting ends.

Figures 7 and 8 are side and top plan views of the meeting ends of a modified form of clip.

Figure 9 is a side view of yet another modified form.

Referring first to the form shown in Figures 1, 3, 4, 5 and 6, the letter A designates the clip as a whole, comprising a single piece of wire, bent between its ends to form a central or intermediate body member 1, which is preferably formed in a single plane, and two end members, 2 and 3. The arm 2 is bent up at 4, where it joins the body member 1, and similarly, the arm 3 is bent up at 5, where it joins the body member 1, thus forming between the two arms and the body 1 a substantially U-shaped pivotal bearing for a body spring wire B, or other object about which the clip A as a whole, is to engage.

At the end of the arm 2, the wire is bent outwardly and then back upon itself to form an elongated loop, designated as a whole at 6,—the bending being in a plane transverse to the plane in which the arm 2 and body 1 lie. The arm 3 lies in the same plane as the body 1, and its outer end is bent at 7 upwardly and angularly from the arm 3, and then bent upon itself as indicated at 8, so that in side view the hook or engaging end of the arm will have the general appearance of a goose-neck. This bent portion of the arm 3 will lie in the vertical plane of the arm 3 and body 1. The normal inclination and relative positions of the body 1 and the arms 2 and 3 are shown in Figure 3, the loop 6 substantially resting upon the top of the return member 8. In this position it will be very easy to engage the clip A with a wire B, by placing the wire B at the juncture of the loop 6 and the member 8, then pulling the clip as a whole in a direction away from the wire B.

To engage the arms 2 and 3 with each other, so that the disengagement thereof will not be easy, pressure is brought to bear upon the arm 2 in the direction indicated by the arrow in Figure 4. Such pressure will, in the first instance, cause the arm 3 to be moved or sprung downwardly towards the body 1, and until the outer end 9 of the loop 6 slides up along the member 8 and over its curved back, when the resilient action of the spring arm 3 will cause said arm to move from the position shown in Figure 4 to the position shown in Figure 5, which movement will cause the goose-neck 7 and 8 to enter the loop 6 and cause the extreme outer end 9 of the loop 6 to enter the recess 10 in the goose-neck. In this position the clip will firmly hold the body springs B, B against movement away from each other, as will be readily understood.

In order to disengage the clip from the body springs B, B, it will first be necessary to exert pressure on the arm 3 in the direction indicated by the arrow in Figure 6. Such pressure will flex the arm 3, drawing the inclined member 7 against the inside of the end 9 of the loop 6. The normal tendency of the arm 2 to spring back to the position shown in Figure 3 will cause the end 9 of the loop to ride over the curved portion joining the members 7 and 8. The spring B may then be moved outwardly between the member 8 and loop 6.

In the clip thus described, it will be seen that the loop 6 and goose-neck end of the arm 3 are so formed as to be positioned substantially midway of the body 1. There are forms of structures in which clips are used where it will be desirable to have the arm 2 shorter than the arm 3, and such modification is shown in Figure 2,—the structure being otherwise the same as that shown in Figure 3 and operating similarly.

After the clip described has been secured about two body spring wires B, B, and is in the position shown in Figure 5, it may be desirable to lock the same against accidental pressures on the arms 2 and 3, and this locking arrangement is illustrated in Figures 7 and 8. It consists in twisting the members 7 and 8 after being engaged in the loop 6, into the position shown, transversely of the loop 6. It will be manifest, upon considering Figure 8, that in such arrangement, any downward pressure on the member 3, such as was indicated in connection with Figure 6, would not cause the goose-neck end 7, 8, to ride into and through the loop and thus become disengaged from the loop, for the reason that the space between the parallel side members of the loop 6 will be less than the length of the member 8.

The forms thus described show the body member 1 to be straight, as are also the arms 2 and 3, but in the modified form shown in Figure 9, the body member and the arms 2 and 3 are merged in one curved or circular arrangement with the loop 6 applied to one end and the goose-neck 7, 8, to the other end, as in the other forms of clips, so that the ends may be engaged in the manner heretofore described.

While I have shown my improved clip as particularly adapted for locking together adjacent coils of upholstery springs B, B, it will be manifest that this clip will have many other uses which may require slight modifications as to details, which will occur to the skilled mechanic in the art; and therefore I wish to include in the scope of my invention, all such modifications, providing the two ends of the clip are adapted to be secured together by a loop and what I have herein called a goose-neck connection.

I claim as my invention:

1. A clip composed of a single piece of wire bent upon itself to form a body member and two oppositely directed arms of unequal length, the end of one arm being bent to form a loop and the end of the other arm being bent in goose-neck form for engagement with said loop.

2. A clip comprising a single piece of wire bent upon itself to form a body member and two oppositely directed arms, means on the arm ends for operative engagement with each other, and means for causing the interengagement of the arm ends upon actuating one arm, and for causing disengagement of the arm ends upon actuating the other arm.

3. A clip comprising a single piece of wire bent upon itself to form a body member and two yielding, oppositely directed arms, an elongated, relatively narrow loop on the end of one arm, a goose-neck bend on the other arm, adapted to be entered through said elongated loop, and means for locking the same after their inter-engagement.

4. A clip comprising a single piece of wire bent upon itself to form a back member and two oppositely directed, yielding arms, the end of one arm being bent upon itself to form an elongated but narrow slotted loop, the end of the other arm being bent into goose-neck form and of a length greater than the width of the loop on the other arm, the goose-neck end being adapted to be twisted, after passing through the loop, to a locking position across the loop.

In testimony, that I claim the foregoing as my invention I affix my signature this 29th day of March, 1926.

JAMES L. MacINERNEY.